United States Patent [19]

Ellenberg

[11] Patent Number: 5,064,085
[45] Date of Patent: Nov. 12, 1991

[54] STOPPER FOR ASEPTIC CONTAINERS

[75] Inventor: Martin Ellenberg, Langhirano, Fed. Rep. of Germany

[73] Assignee: El.PO S.r.l., Mulazzano Ponte, Italy

[21] Appl. No.: 596,051

[22] Filed: Oct. 11, 1990

[30] Foreign Application Priority Data

Oct. 18, 1989 [IT] Italy ............................... 40154 A/89

[51] Int. Cl.⁵ .............................................. B65D 39/00
[52] U.S. Cl. .................................................. 215/355
[58] Field of Search .......... 215/355, 296, 306, DIG. 3

[56] References Cited
U.S. PATENT DOCUMENTS 4,094,429  6/1978  Urbin ................................... 215/320

FOREIGN PATENT DOCUMENTS

759666  10/1956  United Kingdom .
886821  1/1962   United Kingdom ................ 215/355
1158278 7/1969   United Kingdom ................ 215/355

Primary Examiner—Stephen Marcus
Assistant Examiner—Paul Schwarz
Attorney, Agent, or Firm—Darby & Darby

[57] ABSTRACT

Containers used for packaging aseptically batched liquid food products, typically fruit juices, puree and pulp, are stoppered by a plug (1) inserted into the relative mouth or filler neck (6); the plug is shaped and molded such that an annular flash left by the molding process, is positioned away from the area of contact between the plug and the mouth of the container.

5 Claims, 1 Drawing Sheet

STOPPER FOR ASEPTIC CONTAINERS

BACKGROUND OF THE INVENTION

The present invention relates to a stopper for aseptic containers.

Conventionally, stoppers for aseptic containers include a type made from plastic material, embodied substantially as a cylindrical plug, which affords a plurality of projecting and reentrant annular profiles compassing its outer cylindrical periphery and matched to similar reentrants and projections afforded internally by the mouth of a container. Such stoppers are fashioned generally by bringing together two mold or die halves, of which the relative internal surfaces bear semicylindrical impressions corresponding each to one half of the stopper. When brought together, the two die halves unite along two diametrically opposite longitudinal generators of the cylinder.

Stoppers of the type in question tend however to be adversely affected by the appearance of flashes or fins, which are attributable to lack of precision in the molding operation, or to worn dies.

This excess material constitutes a serious problem, as the fit between the stopper and the mouth of the relative container becomes less exact; consequently one has the possibility that air will penetrate the container, and render the entire aseptic filling process ineffective.

The object of the present invention is to overcome the drawback mentioned above, and in particular to ensure a faultless fit between the stopper and the mouth of the container, such that the aseptic state of a product can be guaranteed.

SUMMARY OF THE INVENTION

The stated object is fully realized with a stopper for aseptic containers according to the present invention.

Such a stopper is fashioned from plastic material, and consists in a plug of substantially cylindrical embodiment, exhibiting a plurality of annular projections and reentrants compassing its external circular periphery of which the shape is identical and complementary to that of similar profiles afforded internally by the mouth of a container to be stoppered.

An essential features of the invention is that any flashes left on the plug by molding are annular, and occupy an area remote from the area of contact between the plug and the mouth of the container.

BRIEF DESCRIPTION OF THE DRAWINGS

The invention will now be described in detail, by way of example, with the aid of the accompanying drawings, in which.

DESCRIPTION OF THE PREFERRED EMBODIMENTS

With reference to the drawings, 1 denotes a plug of substantially cylindrical embodiment, molded in such a way as to incorporate annular projections 2 and reentrants 3 which are substantially identical to matching annular profiles 4 and projections 5 afforded internally by the mouth 6 of a container (not illustrated). The annular projections 2 are located below a top edge 7 of the plug, such that when the container is stoppered, these will settle on the profiles 4 whilst the reentrants 3 will be forced over the projections 5 of the mouth.

The plug is molded by bringing together two dies (not illustrated), in a movement coinciding with the axis of the stopper; the one die carries an internal impression of the cylindrical part of the plug below the annular projections 2, and the other an internal impression of the top edge 7, in such a way that any surplus material issuing from the mold will appear as an annular flash 10 around the topmost edge 7 of the plug, rather than as fins issuing from the outer cylindrical surface. Thus, according to the invention, the formation of any such annular molding flashes will in no way affect the fit and sealing action between the plug 1 and the mouth 2 of the container; also, by totally avoiding the formation of molding fins on the external lateral surface of the plug, it becomes possible to enhance the sealing action and eliminate problems connected with the penetration of air into containers.

Figure 1:
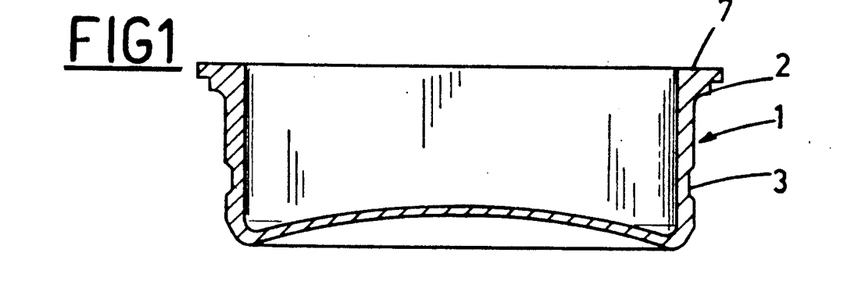
FIG. 1 illustrates the stopper in partial section through a vertical diametral plane.
Figure 2:
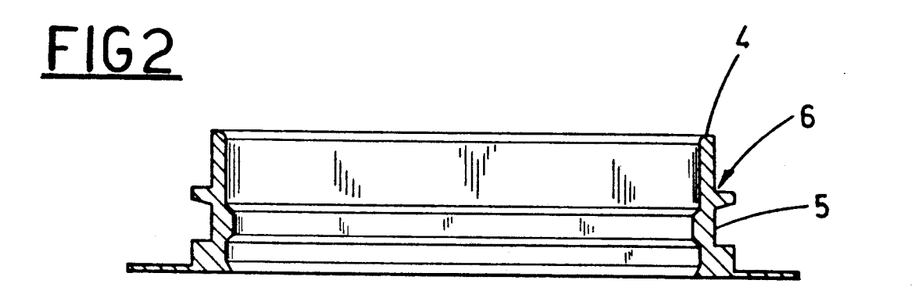
FIG. 2 illustrates the mouth of a container, viewed in section through the same plane as that of FIG. 1.
Figure 3:
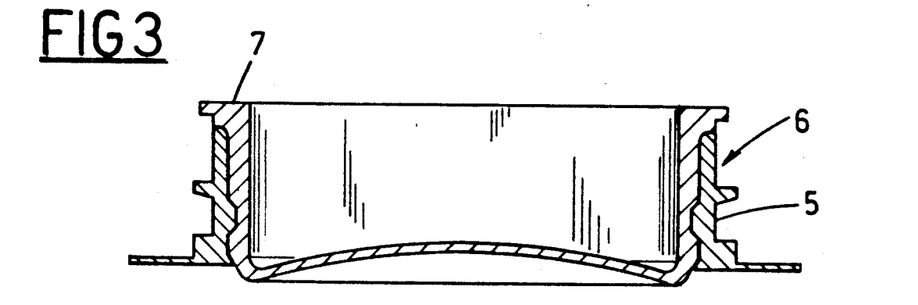
FIG. 3 illustrates the stopper inserted into the mouth of the container, viewing in section through the same plane as that of FIGS. 1 and 2.
Figures 3, 4:
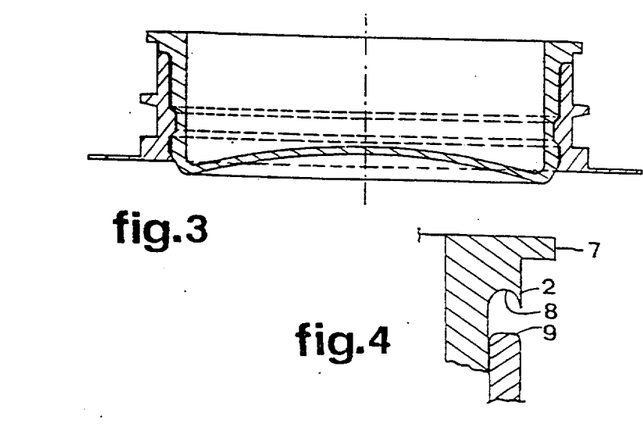
FIG. 4 is a detail of the stopper and the mouth of the container, illustrating a possible alternative embodiment of the invention.
Figure 4:
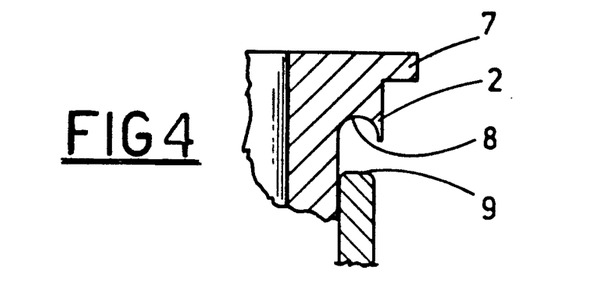

In a possible alternative embodiment of the stopper illustrated in FIG. 4, the projections 2 afforded by the plug 1 are shaped in such a way as to include an annular groove 8 of substantially semicircular section, which is designed to fit over an annular profile 9 of substantially rounded trapezoidal section offered by the uppermost rim of the mouth of the container.

What is claimed:

1. A stopper for an aseptic container, the stopper contacting a mouth of the container in an area of contact when stoppered, comprising a plug molded from plastic material and substantially cylindrical in embodiment, the stopper having a flash formed on the plug during molding, the stopper exhibiting a plurality of annular projections and reentrants compassing its external circular periphery of which the shape is substantially identical and complementary to that of similar profiles afforded internally by the mouth of the container to be stoppered, wherein the flash is annular and occupies an area remote from the area of contact between the plug and the mouth of the container.

2. A stopper for an aseptic container as in claim 1, wherein the annular projections and the annular reentrants of the plug are faultlessly matched to respective annular profiles and annular projections afforded by the mouth of the container, in such a way that a perfect seal is created at the moment of stoppering the container.

3. A stopper for an aseptic container as in claim 1, wherein the annular projections are molded in such a way as to incorporate an annular groove that registers with an annular profile afforded by the uppermost part of the mouth at the moment of stoppering the container.

4. A stopper for an aseptic container as in claim 3, wherein the annular groove is substantially semicircular in section and the annular profile is substantially of rounded trapezoidal section.

5. A stopper for an aseptic container, the stopper contacting a mouth of the container in an area of contact when stoppered, comprising a plug molded from plastic material and substantially cylindrical in embodiment, the stopper having a flash formed on the plug during molding, the stopper exhibiting a plurality of annular projections and reentrants compassing its external circular periphery of which the shape is substantially identical and complementary to that of similar profiles afforded internally by the mouth of the container to be stoppered, wherein the flash is annular and occupies an area remote from the area of contact between the plug and the mouth of the container, said plug further having a top edge, the remote area coinciding with the top edge of the plug.

* * * * *

UNITED STATES PATENT AND TRADEMARK OFFICE
CERTIFICATE OF CORRECTION

PATENT NO. : 5,064,085

DATED : November 12, 1991

INVENTOR(S) : Martin Ellenberg

It is certified that error appears in the above-identified patent and that said Letters Patent is hereby corrected as shown below:

Figures 1-4 should be deleted to replaced with Figures 1-4 as shown on the attached sheet.

Signed and Sealed this

Eighth Day of November, 1994

*Attest:*

BRUCE LEHMAN

*Attesting Officer*  *Commissioner of Patents and Trademarks*

United States Patent [19]

Ellenberg

[11] Patent Number: 5,064,085
[45] Date of Patent: Nov. 12, 1991

[54] STOPPER FOR ASEPTIC CONTAINERS

[75] Inventor: Martin Ellenberg, Langhirano, Fed. Rep. of Germany

[73] Assignee: El.PO S.r.l., Mulazzano Ponte, Italy

[21] Appl. No.: 596,051

[22] Filed: Oct. 11, 1990

[30] Foreign Application Priority Data

Oct. 18, 1989 [IT] Italy .............................. 40154 A/89

[51] Int. Cl.5 .............................................. B65D 39/00
[52] U.S. Cl. .................................................. 215/355
[58] Field of Search .......... 215/355, 296, 306, DIG. 3

[56] References Cited

U.S. PATENT DOCUMENTS 4,094,429  6/1978  Urbin ................................ 215/320

FOREIGN PATENT DOCUMENTS

759666  10/1956  United Kingdom .
886821  1/1962  United Kingdom ............... 215/355
1158278  7/1969  United Kingdom ............... 215/355

Primary Examiner—Stephen Marcus
Assistant Examiner—Paul Schwarz
Attorney, Agent, or Firm—Darby & Darby

[57] ABSTRACT

Containers used for packaging aseptically batched liquid food products, typically fruit juices, puree and pulp, are stoppered by a plug (1) inserted into the relative mouth or filler neck (6); the plug is shaped and molded such that an annular flash left by the molding process, is positioned away from the area of contact between the plug and the mouth of the container.

5 Claims, 1 Drawing Sheet fig.1 fig.2 fig.3 fig.4

UNITED STATES PATENT AND TRADEMARK OFFICE
CERTIFICATE OF CORRECTION

PATENT NO. : 5,064,085
DATED : November 12, 1991
INVENTOR(S) : Martin Ellenberg

It is certified that error appears in the above-indentified patent and that said Letters Patent is hereby corrected as shown below:

The title page, showing an illustrative figure, should be deleted and substitute therefor the attached title page.

Delete Drawing Sheets 1-4, and substitute therefor the Drawing Sheets consisting of FIGS. 1-4, as shown on the attached pages.

This certificate supersedes Certificate of Correction issued November 8, 1994

Signed and Sealed this

Twenty-third Day of May, 1995

Attest:

BRUCE LEHMAN

Attesting Officer     Commissioner of Patents and Trademarks

United States Patent [19]

Ellenberg

[11] Patent Number: 5,064,085
[45] Date of Patent: Nov. 12, 1991

[54] STOPPER FOR ASEPTIC CONTAINERS

[75] Inventor: Martin Ellenberg, Langhirano, Fed. Rep. of Germany

[73] Assignee: ELPO S.r.L, Mulazzano Ponte, Italy

[21] Appl. No.: 596,051

[22] Filed: Oct. 11, 1990

[30] Foreign Application Priority Data

Oct. 18, 1989 [IT] Italy ............ 40154 A/89

[51] Int. Cl.⁵ .................................. B65D 39/00
[52] U.S. Cl. ...................................... 215/355
[58] Field of Search ......... 215/355, 296, 306, DIG. 3

[56] References Cited

U.S. PATENT DOCUMENTS 4,094,429  6/1978  Urbin .................... 215/320

FOREIGN PATENT DOCUMENTS

759666   10/1956  United Kingdom
886821   1/1962   United Kingdom ........ 215/355
1158278  7/1969   United Kingdom ........ 215/355

Primary Examiner—Stephen Marcus
Assistant Examiner—Paul Schwarz
Attorney, Agent, or Firm—Darby & Darby

[57] ABSTRACT

Containers used for packaging aseptically batched liquid food products, typically fruit juices, puree and pulp, are stoppered by a plug (1) inserted into the relative mouth or filler neck (6); the plug is shaped and molded such that an annular flash left by the molding process, is positioned away from the area of contact between the plug and the mouth of the container.

5 Claims, 1 Drawing Sheet